United States Patent
Alvarez Dominguez et al.

(10) Patent No.: US 12,476,882 B2
(45) Date of Patent: Nov. 18, 2025

(54) METHOD, APPARATUS AND SYSTEM FOR NF SELECTION

(71) Applicant: Telefonaktiebolaget LM Ericsson (PUBL), Stockholm (SE)

(72) Inventors: Rodrigo Alvarez Dominguez, Madrid (ES); Miguel Angel Muñoz De La Torre Alonso, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/547,355

(22) PCT Filed: Apr. 21, 2021

(86) PCT No.: PCT/EP2021/060297
§ 371 (c)(1),
(2) Date: Aug. 22, 2023

(87) PCT Pub. No.: WO2022/179713
PCT Pub. Date: Sep. 1, 2022

(65) Prior Publication Data
US 2024/0137290 A1   Apr. 25, 2024
US 2024/0235958 A9   Jul. 11, 2024

(30) Foreign Application Priority Data
Feb. 24, 2021   (EP) .................................. 21382156

(51) Int. Cl.
*H04L 41/40*      (2022.01)
*H04L 41/082*     (2022.01)
(Continued)

(52) U.S. Cl.
CPC ............ *H04L 41/40* (2022.05); *H04L 41/082* (2013.01); *H04L 43/0852* (2013.01); *H04L 43/0888* (2013.01); *H04L 43/20* (2022.05)

(58) Field of Classification Search
None
See application file for complete search history.

(56) References Cited

U.S. PATENT DOCUMENTS 10,637,753 B1 *  4/2020  Taft ........................ H04W 24/10
2017/0214612 A1 * 7/2017  Leitner ............... H04L 49/9036
(Continued)

FOREIGN PATENT DOCUMENTS

EP      3739919 A1      11/2020
EP      3843341 A1       6/2021
(Continued)

OTHER PUBLICATIONS

3GPP TS 29.510 V16.5.0 (Sep. 2020); 3rd Generation Partnership Project; Technical Specification Group Core Network and Terminals; 5G System; Network Function Repository Services; Stage 3 (Release 16).
(Continued)

*Primary Examiner* — Fadi Haj Said
(74) *Attorney, Agent, or Firm* — Baker Botts L.L.P.

(57) ABSTRACT

Methods, apparatus and systems performed and configured to operate in a wireless communication network are presented. In example implementations, a request to register or update a Network Function, NF, profile of an NF in a Network Repository Function, NRF, is sent from the NF to the NRF. The NF profile signaled via the request comprises one or more parameters relating to one or more of a hardware characteristic of hardware comprised in the wireless communication network, a latency characteristic of the wireless communication network, and a throughput characteristic of the wireless communication network. An acknowledgement of the request may be sent from the NRF to the NF.

16 Claims, 10 Drawing Sheets

(51) Int. Cl.
  *H04L 43/0852* (2022.01)
  *H04L 43/0888* (2022.01)
  *H04L 43/20* (2022.01)

(56) References Cited

U.S. PATENT DOCUMENTS

| | | | |
|---|---|---|---|
| 2020/0228420 A1* | 7/2020 | Dao | H04L 41/5032 |
| 2021/0152554 A1* | 5/2021 | Taft | H04L 41/0895 |
| 2021/0234934 A1* | 7/2021 | Xia | H04L 67/51 |
| 2023/0049980 A1* | 2/2023 | Sharma | H04W 12/041 |

FOREIGN PATENT DOCUMENTS

| | | |
|---|---|---|
| WO | 2020108507 A1 | 6/2020 |
| WO | 2021013321 A1 | 1/2021 |

OTHER PUBLICATIONS

ETSI GS NFV-Man 001 V1.1.1 (Dec. 2014); Network Functions Virtualisation (NFV); Management and Orchestration.
3GPP TS 23.501 V16.3.0 (Dec. 2019); 3rd Generation Partnership Project; Technical Specification Group Services and System Aspects; System architecture for the 5G System (5GS); Stage 2 (Release 16).
5G PPP Architecture Working Group; View on 5G Architecture; Date: Jun. 19, 2019; Version 3.0; Dissemination level: Public Consultation.
International Search Report issued for International application No. PCT/EP2021/060297—Nov. 18, 2021.
PCT Written Opinion of the International Searching Authority issued for International application No. PCT/EP2021/060297—Nov. 18, 2021.
EPO Communication pursuant to Article 94(3) EPC issued for Application No. 21 719 166.7-1218—May 22, 2025.

* cited by examiner

METHOD, APPARATUS AND SYSTEM FOR NF SELECTION

PRIORITY

This nonprovisional application is a U.S. National Stage Filing under 35 U.S.C. § 371 of International Patent Application Serial No. PCT/EP2021/060297 filed Apr. 21, 2021 and entitled "METHOD, APPARATUS AND SYSTEM FOR NF SELECTION" which claims priority to European Patent Application No. 21382156.4 filed Feb. 24, 2021, both of which are hereby incorporated by reference in their entirety.

TECHNICAL FIELD

The present disclosure generally relates to wireless communication. In more detail, aspects of the present disclosure relate to registering or updating a Network Function (NF) profile of an NF in a Network Repository Function (NRF). An NF may be selected based on one or more of hardware characteristics, latency characteristics and throughput characteristics in the wireless communication network. These aspects can be implemented as methods, computer program products, apparatus and systems, and may in particular pertain to Operation, Administration and Maintenance (OAM) in $5^{th}$ generation (5G) networks.

BACKGROUND

The $3^{rd}$ Generation Partnership Project (3GPP) is developing technical specifications (TSs) for 5G communication systems. 3GPP TS 23.501 V16.7.0 (2020-12) defines architectural aspects of a 5G Service Based Architecture (SBA). According to this SBA, NFs use service-based interactions to consume services from other NFs. The discovery of services and of NFs producing them is provided by an NRF.

Service producing NFs register, update or deregister their profiles in the NRF. Service consuming NFs discover services offered by NF producer instances by querying the NRF about NF instances offering services of a given type. NFs may subscribe and unsubscribe to changes in the status of NFs registered in the NRF. Based on such subscriptions, the NRF may notify NFs of status changes of other NFs.

For the aforementioned (and other) procedures, the NRF provides the so-called Nnrf_NFManagement service in an exemplary 5G implementation (see Sect. 5.2 of 3GPP TS 29.510 V16.6.0 (2020-12)). Moreover, NFs may also query the NRF to discover services provided by other NFs and how to consume them. For these procedures, the NRF provides the so-called Nnrf_NFDiscovery service in an exemplary 5G implementation (see Sect. 5.3 of TS 29.510).

As the complexity of 5G systems continues to increase, it may be more and more difficult, and in some instances impossible, for conflicts between entities participating in the 5G system to be avoided. Different entities which participate in the 5G system may take certain decisions. As a result, a variety of types of conflicts may arise.

Such conflicts include, for example, resource conflicts, in which several services may have been accepted, but the same resources may be needed in order to fulfil their respective quality requirements. Such resource conflicts may arise due to incorrect admission control over too aggressive oversubscription. Such a conflict may result in fines which may need to be paid, though the conflicts still need to be resolved.

Another conflict example relates to rules which might conflict with each other, for instance when providing a service out of functions that may specify mutually incompatible packet forwarding behavior. These conflicts may be detected by a Management and Orchestration (MANO) system.

Furthermore, feature interaction conflicts are possible. In particular, at a service level, a service conflict may be a "call waiting" and "call forwarding" feature interaction problem.

A possible solution to the above problems is to avoid the conflicts, or detect and resolve the conflicts. In order to do so, in some examples, pre-fixed policies (either specified by the platform in general or by a service) are implemented. There are limitations to these possible solutions.

In the example of a Protocol Data Unit (PDU) session establishment procedure, when a subscriber registers and creates a PDU session, an NF selection mechanism is performed which may be based on different criteria. For instance, in the case of a User Plane Function (UPF) selection (by the Session Management Function (SMF)), the selection may be based, for example, on UPF load information and on a subscriber's profile. However, existing mechanisms are not optimal, since, for example, with current mechanisms, the selection may not guarantee the Service Level Agreement (SLA) for each subscriber and per application that may need to be provided by the network. Such load information (relating to central processing unit (CPU) and memory) may only reflect which space is left to allocate new users or PDU sessions for the NF instance.

SUMMARY

Accordingly, there is a need for a technique that avoids one or more of the above drawbacks.

According to a first aspect, a method performed by a Network Function (NF) in a wireless communication network is provided. The method comprises sending, by the NF to a Network Repository Function (NRF), a request to register or update an NF profile of the NF in the NRF. The NF profile signaled via the request comprises one or more parameters relating to one or more of a hardware characteristic of hardware comprised in the wireless communication network, a latency characteristic of the wireless communication network, and a throughput characteristic of the wireless communication network. The NF then receives from the NRF an acknowledgement of the request.

The request sent by the NF to the NRF may be comprised in an NFRegister service operation in order to register the NF in the NRF by providing the NF profile of the requesting NF to the NRF. The NRF may mark the requesting NF as available to be discovered by other NFs, as will be outlined further below.

Alternatively, the request sent by the NF to the NRF may be comprised in an NFUpdate service operation in order to update the profile of the NF previously registered in the NRF by providing the updated NF profile of the requesting NF to the NRF. The update operation may, in some examples, apply to the whole profile of the NF (i.e. a complete replacement of the existing profile by a new profile), or it may apply only to a subset of the parameters of the profile, for example in order to add, delete or replace services to the NF profile.

In some examples of the method, the hardware characteristic comprises hardware acceleration information. Hardware acceleration may refer to using specialized hardware in order to perform one or more functions faster than may be possible by executing the same one or more functions on a general-purpose CPU and/or on a traditional networking (or other input/output) device (for example network interface controller, switch, storage controller, etc.).

In some examples of the method, the hardware acceleration information relates to a hardware accelerator for one or more of encryption, digital signal processing, packet header processing, packet buffering, packet scheduling, and compression of one or more data files.

In example implementations as described herein, the latency characteristic may comprise a latency for processing a data packet in the NF. This may, for example, relate to latency delays of processing a packet while it enters into the NF until it exits the NF. This latency may be measured in microseconds or any other measurement unit, for example milliseconds, etc.

In some examples of the method, the latency characteristic comprises a latency between two or more virtual machines comprised in the wireless communication network. It may, for example, be defined by the NF whether such virtual machines are collocated with other NFs. A lower latency between virtual machines may provide for better communication.

In some examples of the method, the throughput characteristic comprises a throughput of a communication in the NF. The throughput may be measured as the data transfer rate to and from network media, for example in megabytes, gigabytes, or any other measurement unit. The throughput information may be provided in terms of a maximum throughput and/or a minimum throughput and/or an average throughput.

In some examples of the method, the latency characteristic comprises a latency for one or both of storing information in the NF and retrieving information from the NF. The latency for storing information in the NF may in particular relate to an amount of time for informing an application that a storage operation is completed. It may be measured, for example, in microseconds, milliseconds, or any other measurement unit.

In some examples of the method, the throughput characteristic comprises a throughput for one or both of storing data in the NF and retrieving data from the NF. It may indicate the data transfer rate to and from storage media. This may be measured in megabytes per second, gigabytes per second, or any other measurement unit. The throughput information may be provided in terms of a maximum throughput and/or a minimum throughput and/or an average throughput.

In some examples, the method further comprises analyzing, by the NF, one or both of the latency characteristic and the throughput characteristic of the wireless communication network. This analysis may be performed prior to sending, by the NF to the NRF, the request to update the NF profile of the NF in the NRF.

In some examples, the method further comprises analyzing, by the NF, the hardware characteristic of the hardware comprised in the wireless communication network. This analysis may be performed prior to sending, by the NF to the NRF, the request to update the NF profile of the NF in the NRF.

In a second aspect of the present disclosure, a method performed by an NRF in a wireless communication network is provided. The method comprises receiving, by the NRF from a first NF, a request to register or update an NF profile of the first NF in the NRF. The NF profile signaled via the request comprises one or more parameters relating to one or more of a hardware characteristic of hardware comprised in the wireless communication network, a latency characteristic of the wireless communication network, and a throughput characteristic of the wireless communication network. The NRF then sends an acknowledgement of the request to the first NF.

The request received by the NRF from the NF may be comprised in an NFRegister service operation in order to register the NF in the NRF by providing the NF profile of the requesting NF to the NRF. The NRF may mark the requesting NF as available to be discovered by other NFs, as will be outlined further below.

Alternatively, the request received by the NRF from the NF may be comprised in an NFUpdate service operation in order to update the profile of the NF previously registered in the NRF by providing the updated NF profile of the requesting NF to the NRF. The update operation may, in some examples, apply to the whole profile of the NF (i.e. a complete replacement of the existing profile by a new profile), or it may apply only to a subset of the parameters of the profile, for example in order to add, delete or replace services to the NF profile.

In some examples of the method, the hardware characteristic comprises hardware acceleration information. Hardware acceleration may, as outlined above, refer to using specialized hardware in order to perform one or more functions faster than may be possible by executing the same one or more functions on a general-purpose CPU and/or on a traditional networking (or other input/output) device (for example network interface controller, switch, storage controller, etc.).

In some examples of the method, the hardware acceleration information relates to a hardware accelerator for one or more of encryption, digital signal processing, packet header processing, packet buffering, packet scheduling, and compression of one or more data files.

In example implementations as described herein, the latency characteristic may comprise a latency for processing a data packet in the first NF. This may, for example, relate to latency delays of processing a packet while it enters into the first NF until it exits the first NF. This latency may be measured in microseconds or any other measurement unit, for example milliseconds, etc.

In some examples of the method, the latency characteristic comprises a latency between two or more virtual machines comprised in the wireless communication network. It may, for example, be defined by the first NF whether such virtual machines are collocated with other NFs. A lower latency between virtual machines may provide for better communication.

In some examples of the method, the throughput characteristic comprises a throughput of a communication in the first NF. The throughput may be measured as the data transfer rate to and from network media, for example in megabytes, gigabytes, or any other measurement unit. The throughput information may be provided in terms of a maximum throughput and/or a minimum throughput and/or an average throughput.

In some examples of the method, the latency characteristic comprises a latency for one or both of storing information in the first NF and retrieving information from the first NF. The latency for storing information in the first NF may in particular relate to an amount of time for informing an application that a storage operation is completed. It may be measured, for example, in microseconds, milliseconds, or any other measurement unit.

In some examples of the method, the throughput characteristic comprises a throughput for one or both of storing data in the first NF and retrieving data from the first NF. It may indicate the data transfer rate to and from storage media. This may be measured in megabytes per second, gigabytes per second, or any other measurement unit. The throughput information may be provided in terms of a maximum throughput and/or a minimum throughput and/or an average throughput.

In some examples, the received request to update is based on one or both of the latency characteristic and the throughput characteristic of the wireless communication network analyzed by the first NF. Additionally or alternatively, the received request to update is based on the hardware characteristic analyzed by the first NF.

Example implementations of the methods as described herein may be comprised in a method for establishing a Protocol Data Unit (PDU) session between a user equipment (UE) and the wireless communication network.

In some examples, the method further comprises receiving, by the NRF from a second NF, a request for discovery of a said NF profile of the first NF in the NRF. The NF profile signaled via the request comprises one or more parameters relating to one or more of a hardware characteristic of hardware comprised in the wireless communication network, a latency characteristic of the wireless communication network, and a throughput characteristic of the wireless communication network. The NRF then sends to the second NF a list with a said NF profile and an NF identifier for at least one first NF. Each NF profile comprises the one or more parameters requested to be discovered.

In some examples, the second NF comprises an Access and Mobility Management Function (AMF) and the first NF comprises a Session Management Function (SMF). The NF profile comprises an SMF profile of the SMF. The discovery is based on whether the SMF profile of the SMF comprises a hardware accelerator. The hardware accelerator may relate to one or both of storage computing and network computing in the SMF, as will be outlined further below.

In some examples, the second NF comprises an SMF and the first NF comprises a Policy Control Function (PCF). The NF profile comprises a PCF profile of the PCF. The discovery is based on one or both of whether a latency for storing information in the PCF is less than a first threshold, and whether a throughput for storing information in the PCF is larger than a second threshold.

In some examples, the second NF comprises an SMF and the first NF comprises a User Plane Function (UPF). The NF profile comprises a UPF profile of the UPF. The discovery is based on one or more of whether a latency in the network is less than a third threshold, whether a latency between two or more virtual machines in the network is equal to or less than a fourth threshold, and whether a throughput in the network is larger than a fifth threshold.

In a third aspect of the present disclosure, a method performed in a wireless communication network that comprises a first NF, an NRF, and a second NF is provided. The method comprises sending, by the first NF to the NRF, a request to register or update an NF profile of the first NF in the NRF. The NF profile signaled via the request comprises one or more parameters relating to one or more of a hardware characteristic of hardware comprised in the wireless communication network, a latency characteristic of the wireless communication network, and a throughput characteristic of the wireless communication network. The NRF then receives from the second NF a request for discovery of a said NF profile of the first NF in the NRF. The NF profile signaled via the request comprises one or more parameters relating to one or more of a hardware characteristic of hardware comprised in the wireless communication network, a latency characteristic of the wireless communication network, and a throughput characteristic of the wireless communication network. In some examples, the hardware characteristic and/or the latency characteristic and/or the throughput characteristic relating to the one or more parameters comprised in the discovery request may, respectively, be identical to the hardware characteristic and/or the latency characteristic and/or the throughput characteristic relating to the one more parameters comprised in the register or update request. The NRF then sends to the second NF a list with a said NF profile and an NF identifier for at least one first NF. Each NF profile comprises the one or more parameters requested to be discovered. The second NF then selects a first NF based on the list with the NF profile and the NF identifier for the at least one first NF, obtained from the NRF.

Also provided is a computer program product comprising program code portions that, when executed on at least one processor, configure the processor to perform the method of any of the preceding aspects and examples. The computer program product may be stored on a computer-readable recording medium or may be encoded in a data signal.

Furthermore, an apparatus adapted to operate in a wireless communication network is provided. The apparatus is configured to send, to an NRF, a request to register or update an NF profile of an NF in the NRF. The NF profile signaled via the request comprises one or more parameters relating to one or more of: a hardware characteristic of hardware comprised in the wireless communication network, a latency characteristic of the wireless communication network, and a throughput characteristic of the wireless communication network. The apparatus is further configured to receive, from the NRF, an acknowledgement of the request.

The apparatus discussed above may be configured to perform the method of the first method aspect and any (preferred) example implementations thereof.

A further apparatus adapted to operate in a wireless communication network is provided. The apparatus is configured to receive, from a first NF, a request to register or update an NF profile of the first NF in an NRF. The NF profile signaled via the request comprises one or more parameters relating to one or more of a hardware characteristic of hardware comprised in the wireless communication network, a latency characteristic of the wireless communication network, and a throughput characteristic of the wireless communication network. The apparatus is further configured to send, to the first NF, an acknowledgement of the request.

The apparatus discussed above may be configured to perform the method of the second method aspect and any (preferred) example implementations thereof.

A system as presented herein comprises the two apparatus discussed above.

Furthermore, a system adapted to operate in the wireless communication network is provided. The system may comprise a first NF, an NRF and a second NF provided in the wireless communication network. The system is configured such that the first NF sends to the NRF a request to register or update an NF profile of the first NF in the NRF. The NF profile signaled via the request comprises one or more parameters relating to one or more of a hardware characteristic of hardware comprised in the wireless communication network, a latency characteristic of the wireless communication network, and a throughput characteristic of the wireless communication network. The system is further configured so that the NRF receives from a second NF a request for discovery of a said NF profile of the first NF in the NRF. The NF profile signaled via the request comprises one or more parameters relating to one or more of a hardware characteristic of hardware comprised in the wireless communication network, a latency characteristic of the wireless communication network, and a throughput characteristic of the wireless communication network. In some examples, the hardware characteristic and/or the latency characteristic and/or the throughput characteristic relating to the one or more parameters comprised in the discovery request may, respectively, be identical to the hardware characteristic and/or the latency characteristic and/or the throughput characteristic relating to the one more parameters comprised in the register or update request. The system is further configured so that the NRF sends to the second NF a list with a said NF profile and an NF identifier for at least one first NF. Each NF profile comprises the one or more parameters requested to be discovered. The system is further configured so that the second NF selects a first NF based on the list with the NF profile and the NF identifier for the at least one first NF, obtained from the NRF. The system may be configured to implement any one or more of the above-identified first to third aspects and any (preferred) example implementations thereof.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
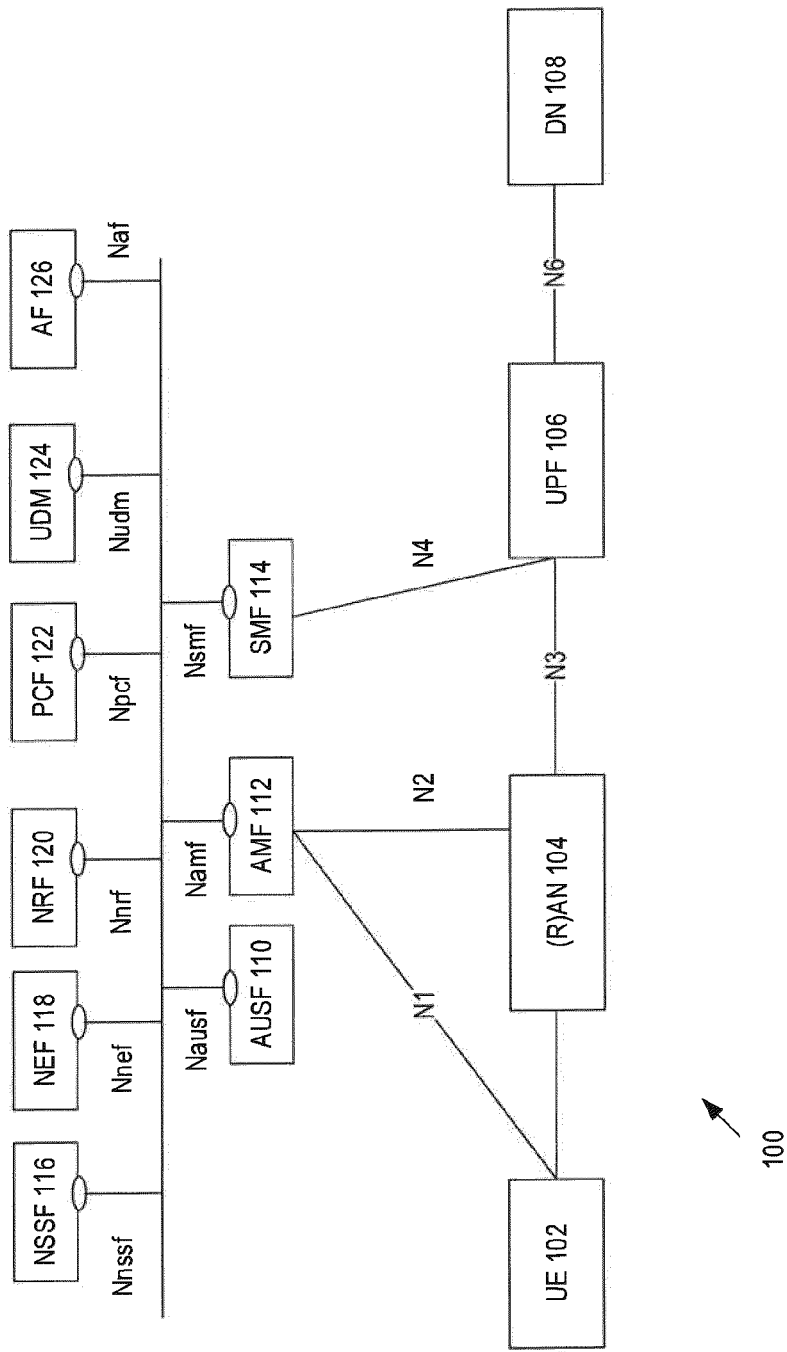
FIG. 1 is a diagram illustrating an exemplary 5G network architecture that may form the basis of examples of the present disclosure.

In the following description, for purposes of explanation and not limitation, specific details are set forth in order to provide a thorough understanding of the present disclosure. It will be apparent to one of skill in the art that the present disclosure may be practiced in other embodiments that depart from these specific details.

While, for example, the following description focuses on an exemplary network configuration in accordance with 5G specifications, the present disclosure is not limited in this regard. The present disclosure could, for example, also be implemented in other cellular or non-cellular wireless communication networks, such as those complying with $4^{th}$ generation (4G) specifications (e.g., in accordance with the Long Term Evolution (LTE) specifications as standardized by the $3^{rd}$ Generation Partnership Project (3GPP)).

Those skilled in the art will further appreciate that the steps, services and functions herein may be implemented using individual hardware circuits, using software functioning in conjunction with a programmed microprocessor or general purpose computer, using one or more application specific integrated circuits (ASICs) and/or using one or more digital signal processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by the one or more processors.

In the following description of exemplary implementations, the same reference numerals denote the same or similar components.

FIG. 1 illustrates a block diagram of a wireless communication network 100 according to examples described herein. In this example, the 5G network architecture may relate to a non-roaming architecture.

A portion of the 5G reference architecture is defined by 3GPP (see, e.g., Section 4.2.3 of 3GPP TS 23.501 V16.3.0). Some architectural core network entities (network functions, NFs) and core network interfaces for examples of the present disclosure may include:

1) A User Equipment (UE) 102 as an exemplary terminal device. The UE 102 constitutes, for example, an endpoint of a voice-over-IP call or of a video or audio streaming session that stretches via the access network domain (AND), such as via a (radio) access network ((R)AN) 104.

2) An Application Function (AF) 126 located outside the core network domain (CND) and typically implemented as, or on, an application server operated by a dedicated service provisioning entity (e.g., an Over-the-top (OTT) entity). The AF 126 is configured to interact with the CND via an Naf interface. In some examples outlined herein, the AF 126 may provide voice-over-IP, video streaming or audio streaming services.

3) A Network Exposure Function (NEF) 118 has an Nnef interface and supports different functionalities. Specifically, in the context of some examples outlined herein, the NEF 118 may act as an entry point into the CND for the AF 126. The AF 126 thus interacts with the CND through the NEF 118.

4) A Session Management Function (SMF) 114 has N4 and Nsmf interfaces. The SMF 114 supports procedures such as session establishment, modification and release as well as policy-related functionalities. In particular, the SMF 114 configures User Plane Function (UPF) 106 (for example for event reporting). Moreover, in some examples, the SMF 114 configures the UPF 106 accordingly through the N4 interface using the Packet Forwarding Control Protocol (PFCP).

5) The User Plane Function (UPF) 106 has an N4 interface to the SMF 114 and an N3 interface to (R)AN 104. The UPF 106 supports handling of user plane traffic on the user plane based on the rules received from the SMF 114. In particular, in examples outlined herein, the UPF 106 thus supports packet inspection and different enforcement actions (such as, for example, event detection and reporting).

6) The Policy Control Function (PCF) 122 supports, via an Npcf interface, a unified policy framework to govern the core network domain behavior. Specifically, the PCF 122 provides Policy and Charging Control (PCC) rules to SMF 114 and/or UPF 106 to, e.g., detect service traffic and enforce policy and charging decisions according to the PCC rules.

7) A unified data management (UDM) entity 124 centrally stores data (e.g., subscriber information) in the core network domain.

8) An access and mobility management function (AMF) 112 handles access and mobility for the UE 102.

9) A Network Repository Function (NRF) 120 is provided in the wireless communication network 100. The NRF supports in particular the following functionality:

The NRF supports the service discovery function. The NRF may receive an NF Discovery Request from an NF instance, and may provide the information of the discovered NF instances.

Furthermore, the NRF may maintain the NF profile of available NF instances and their supported services.

10) The Network Slice Selection Function (NSSF) 116 may support selecting the set of network slice instances serving the UE 102. Furthermore, the NSSF 116 may determine an AMF 112 Set to be used to serve the UE 102, or, based on configuration, a list of candidate AMF(s), possibly by querying the NRF 120.

11) The Authentication Server Function (AUSF) 110 supports authentication for 3GPP access and untrusted non-3GPP access as specified in TS 33.501. It may further support network slice-specific authentication and authorization as specified in TS 23.502.

12) The Data Network (DN) 108, is coupled to the UPF 106 via interface N6. The DN 108 may, for example, relate to operator services, Internet access or third party services.

Further functionalities and couplings between the entities comprised in the wireless communication network 100 can be found, e.g., in TS 23.501 V16.3.0.

Figure 2:
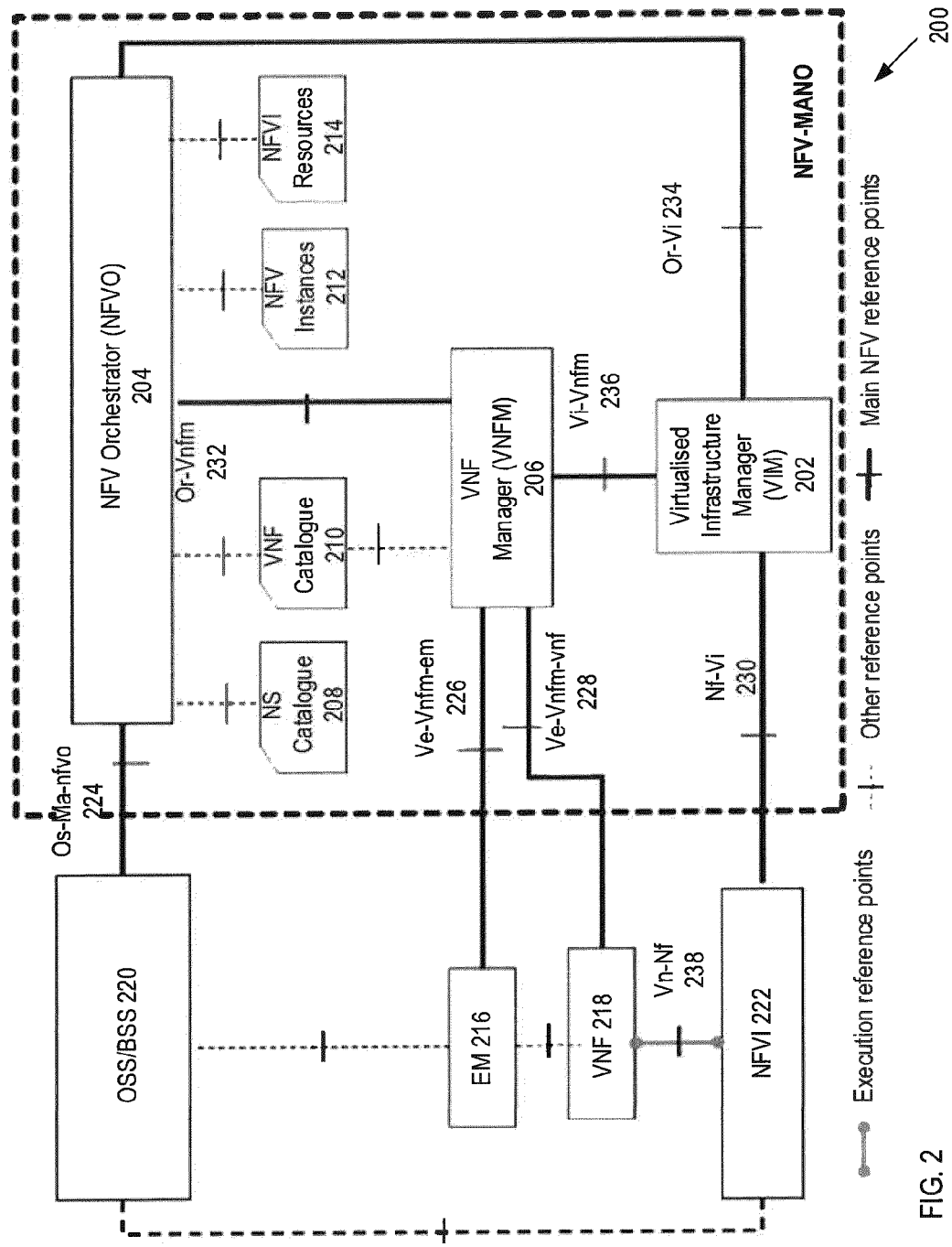
FIG. 2 is a block diagram illustrating a Network Function Virtualization (NFV) architectural framework with reference points.

FIG. 2, taken from ETSI GS NFV-MAN 001 V1.1.1, illustrates a Network Function Virtualization (NFV) architecture 200 according to examples as described herein.

An NFV Orchestrator (NFVO) 204 is provided in the NFV architecture 200, which is responsible for orchestration of Network Function Virtualization Infrastructure (NFVI) resources 214 across multiple virtualised infrastructure managers (VIMs) 202. The NFVO 204 may further be responsible for the life-cycle management of network services.

The VNF manager (VNFM) 206 is responsible for the life-cycle management of VNF 218 instances.

The virtualized infrastructure manager (VIM) 202 is responsible for controlling and managing the NFVI compute, storage and network resources.

The Network Services (NS) Catalogue 208 represents the repository of all of the on-boarded network services, supporting the creation and management of the NS deployment templates, virtual link descriptor, and VNF forwarding graph descriptor via interface operations exposed by the NFVO.

The VNF Catalogue 210 represents the repository of all of the on-boarded VNF Packages, supporting the creation and management of the VNF Package (VNF Descriptor (VNFD), software images, manifest files, etc.) via interface operations exposed by the NFVO.

The NFV Instances 212 repository holds information of all VNF instances and Network Service instance.

The NFVI Resources 214 repository holds information about available/reserved/allocated NFVI resources as abstracted by the VIM across operator's Infrastructure Domains, thus supporting information useful for resources reservation, allocation and monitoring purposes.

The Operations Support System/Business Support System (OSS/BSS) 220 functions may provide management and orchestration of legacy systems and may have full end to end visibility of services provided by legacy network functions in an operator's network.

The Element Management (EM) 216 is responsible for Fault-Management, Configuration, Accounting, Performance and Security (FCAPS) management functionality for a VNF.

The NFVI 222 encompasses all the hardware (e.g. compute, storage, and networking) and software (e.g. hypervisors) components that together provide the infrastructure resources where VNFs are deployed. The NFVI may also include partially virtualized NFs.

Further functionalities and purposes of the entities provided in the NFV architecture 200, and also in relation to the NFV-Management and Orchestration (NFV-MANO) reference points Os-Ma-nfvo 224, Ve-Vnfm-em 226, Ve-Vnfm-vnf 228, Nf-Vi 230, Or-Vnfm 232, Or-Vi 234, Vi-Vnfm 236 and Vn-Nf 238 can be found in ETSI GS NFV-MAN 001 V1.1.1.

As is specified in TS 23.501 V16.3.0, a UPF selection for a specific session may be based on the following information. In particular, one or more of the following parameters and information may be taken into account by the SMF for UPF selection and re-selection:

the UPF's dynamic load;

the UPF's relative static capacity among UPFs supporting the same Data Network Name (DNN);

the UPF location available at the SMF;

UE location information;

the capability of the UPF and the functionality required for the particular UE session: An appropriate UPF may be selected by matching the functionality and features required for a UE;

the Data Network Name (DNN);

the PDU Session Type (i.e. IPv4, IPv6, IPv4v6, Ethernet Type or Unstructured Type) and if applicable, the static IP address/prefix.

Session and Service Continuity (SSC) mode selected for the PDU Session;

the UE subscription profile in UDM;

the Data Network Access Identifier (DNAI) as included in the PCC Rules;

local operator policies;

Single-Network Slice Selection Assistance Information (S-NSSAI);

access technology being used by the UE;

information related to user plane topology and user plane terminations, that may be deduced from:

Access Node (AN)-provided identities (e.g. Cell-Identifier (ID), Tracking Area Identity (TAI)), available UPF(s) and DNAI(s);

information regarding the user plane interfaces of UPF(s). This information may be acquired by the SMF using N4;

information regarding the N3 User Plane termination(s) of the AN serving the UE. This may be deduced from AN-provided identities (e.g. CellID, TAI);

information regarding the N9 User Plane termination(s) of UPF(s) if needed; and information regarding the User plane termination(s) corresponding to DNAI(s).

How the SMF determines information about the user plane network topology from information listed above, and what information is considered by the SMF, may, in some examples, be based on the operator configuration.

An NF profile is defined in TS 29.510 V16.5.0, Sec. 6.1.6.2.2 as being composed for several attributes, such as IP address and/or Fully Qualified Domain Name (FQDN) of the NF, the name of the NF and specific information which may depend on each NF. For example, upfinfo is defined in Sec. 6.1.6.2.13 in TS 29.510 V16.5.0.

Example implementations according to the present disclosure provide for a mechanism for registering (or updating) NF capabilities which may relate in particular to the hardware and information related to throughput and latency of the hardware on which the NF runs its software. One or more corresponding nodes, for example, at a PDU session establishment may select a specific NF instance based on the information regarding the hardware and/or the throughput and/or the latency.

Procedures for registering and updating an NF in the NRF are defined in TS 29.510 V16.5.0. According to example implementations outlined throughout the present disclosure, new parameters relating to hardware characteristics and/or throughput characteristics and/or latency characteristics are taken into account when registering or updating the NF in the NRF.

In some examples, an NF is registered in the NRF, whereby infrastructure characteristics of the NF are registered, for example in order to register whether the platform has a hardware accelerator for network and/or storage purposes. Additionally or alternatively, a throughput and/or latency characteristic of the wireless communication network and/or of a storage comprised in the network may be registered in the NRF.

Similarly, in some examples, an NF may be updated in the NRF, whereby the update information may relate to a throughput and/or a latency characteristic of the wireless communication network and/or a storage comprised in the network.

Such procedures may be implemented, for example, in a PDU session establishment (general as defined in TS 23.501 V16.3.0). An NF may be selected or re-selected based on one or more of hardware characteristics of hardware comprised in the wireless communication system, a throughput characteristic in the wireless communication system and a latency characteristic in the wireless communication system. This new procedure is particularly advantageous, since it is known that software which may use, for example, a hardware accelerator may provide a better quality of service (QoS), and the selection of the NF may be based on an infrastructure with the aforementioned one or more characteristics (for example for a specific type of traffic, such as Ultra-reliable low-latency communication (URLLC)). Furthermore, a more accurate dimensioning of subscribers according to the corresponding Service Level Agreement (SLA) for each subscriber may be provided.

Figure 3:
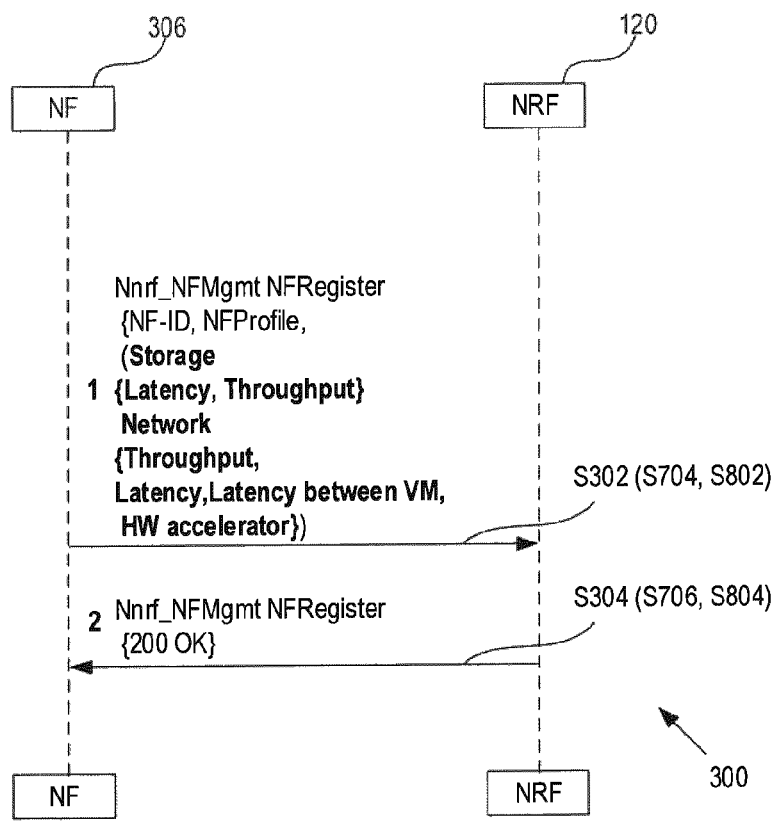
FIG. 3 is a sequence diagram of an NF registration method according to examples of the present disclosure.

FIG. 3 shows a sequence diagram 300 for registering an NF 306 in an NRF 120. This NF registration procedure is generally based on the mechanism as defined in TS 29.510 V16.5.0. However, the NF profile includes, according to the present disclosure, information which is not currently included in the standard specification.

In this example, the NF 306 sends an Nnrf_NFMgmt NFRegister request to the NRF 120 in step S302. As outlined further below in relation to FIGS. 7 and 8, this step may relate to steps S704 and S802, respectively.

The request contains information relating to the NF-ID and the NF profile. In this example, information is provided to the NRF, which information relates generally to storage computing characteristics and network computing characteristics.

In relation to the storage computing characteristics, the information comprises a latency for storing information in the NF, a throughput for storing information in the NF, and regarding further storage computing capabilities, hardware accelerator information. Such hardware accelerator information may, in some examples, refer to a compression of files and/or direct access to a memory bus and/or an access to an on-chip system bus (e.g. peripheral component interconnect express (PCIe)). Hardware accelerator techniques in relation to which information may be provided in the request to the NRF may comprise techniques defined in ETSI GS NFV-INF 003 V1.1.1.

Therefore, the storage information is generally composed of storage throughput information, storage latency information and storage hardware accelerator information.

The storage throughput may hereby measure the data transfer rate to and from the storage media. It may be measured in megabytes per second, gigabytes per second, or any other measurement unit. This information may be included in the NF profile in terms of a maximum throughput and/or a minimum throughput and/or an average throughput in relation to the data transfer rate to and from the storage media.

The storage latency may, in some examples, be defined as the outcome from all of the other performance points that are built into the storage pathway. The storage latency may be the amount of time that an application may have to wait before it is being told that a storage operation is or has been completed. The storage latency may be provided in microseconds, milliseconds or any other measurement unit. This information may be included in the NF profile in terms of a maximum latency and/or a minimum latency and/or an average latency of the storage.

The storage hardware accelerator functionality may enable a host to offload specific virtual machine and storage management operations to compliant storage hardware. With the storage hardware systems, the host may perform these operations faster and may consume less CPU, memory, and storage fabric bandwidth.

In relation to the network computing characteristics, the information comprises, in this example, a latency for processing data packets in the NF, a latency between virtual machines—some NFs may define if they are collocated with another NF—, whereby a lower latency between virtual machines provides for better communication, and to a throughput of a communication in the NF. Furthermore, in this example, the request contains hardware accelerator information relating to the network. Such a hardware accelerator may, in some examples, be used in order for packet header processing, packet buffering and scheduling etc. Hardware accelerator may, for example, be in a separate chip or integrated onto the same chip die as the CPU (system on a chip (SoC)), may have direct access to the memory bus or have access to an on-chip system bus (e.g. PCIe). Again, hardware accelerator techniques in relation to which information may be provided in the request to the NRF may comprise techniques defined in ETSI GS NFV-INF 003 V1.1.1.

Therefore, the network information is generally composed of network throughput information, network latency information and network hardware accelerator information.

The network throughput may measure the data transfer rate to and from the network media. It may be measured in megabytes per second, gigabytes per second, or any other measurement unit.

The network latency may relate to latency delays for processing a data packet while it enters into the NF until it exits the NF. This information may be provided in microseconds, milliseconds, or any other measurement unit.

The network hardware accelerator may relate to hardware acceleration functionality that enables a host to offload specific virtual machine and storage management operations to compliant storage hardware. With the storage hardware systems, the host may perform these operations faster and may consume less CPU, memory, and storage fabric bandwidth.

These characteristics are proposed to be included in the NF profile defined in TS 29.510 V16.5.0 as follows (table adapted from Table 6.1.6.2.2-1: Definition of type NFProfile, outlined in TS 29.510 V16.5.0, and modified according to examples of the present disclosure):

| Attribute name | Data type | P | Cardinality | Description |
| --- | --- | --- | --- | --- |
| nfInstanceId | NfInstanceId | M | 1 | Unique identity of the NF Instance. |
| nfType | NFType | M | 1 | Type of Network Function |
| nfStatus | NFStatus | M | 1 | Status of the NF Instance (NOTE 5) |
| nfInstanceName | string | O | 0 . . . 1 | Human readable name of the NF Instance |
| heartBeatTimer | integer | C | 0 . . . 1 | Time in seconds expected between 2 consecutive heart-beat messages from an NF Instance to the NRF.<br>It may be included in the registration request. When present in the request it shall contain the heartbeat time proposed by the NF service consumer.<br>It shall be included in responses from NRF to registration requests (PUT) or in NF profile updates (PUT or PATCH). If the proposed heartbeat time is acceptable by the NRF based on the local configuration, it shall use the same value as in the registration request; otherwise the NRF shall override the value using a preconfigured value. |
| plmnList | array(PlmnId) | C | 1 . . . N | PLMN(s) of the Network Function (NOTE 7).<br>This IE shall be present if this information is available for the NF.<br>If not provided, PLMN ID(s) of the PLMN of the NRF are assumed for the NF. |
| snpnList | array(PlmnIdNid) | C | 1 . . . N | SNPN(s) of the Network Function.<br>This IE shall be present if the NF pertains to one or more SNPNs. |
| sNssais | array(ExtSnssai) | O | 1 . . . N | S-NSSAIs of the Network Function.<br>If not provided, and if the perPlmnSnssaiList attribute is not present, the NF can serve any S-NSSAI.<br>When present this IE represents the list of S-NSSAIs supported in all the PLMNs listed in the plmnList IE.<br>If the sNSSAIs attribute is provided in at least one NF Service, the S-NSSAIs supported by the NF Profile shall be the set or a superset of the S-NSSAIs of the NFService(s). |
| perPlmnSnssaiList | array(PlmnSnssai) | O | 1 . . . N | This IE may be included when the list of S-NSSAIs supported by the NF for each PLMN it is supporting is different. When present, this IE shall include the S-NSSAIs supported by the Network Function for each PLMN supported by the Network Function. When present, this IE shall override sNssais IE. (NOTE 9)<br>If the perPlmnSnssaiList attribute is provided in at least one NF Service, the S-NSSAIs supported per PLMN in the NF Profile shall be the set or a superset of the perPlmnSnssaiList of the NFService(s). |
| nsiList | array(string) | O | 1 . . . N | NSI identities of the Network Function.<br>If not provided, the NF can serve any NSI. |
| Fqdn | Fqdn | C | 0 . . . 1 | FQDN of the Network Function (NOTE 1) (NOTE 2).<br>For AMF, the FQDN registered with the NRF shall be that of the AMF Name (see 3GPP 23.003 [12] clause 28.3.2.5). |
| interPlmnFqdn | Fqdn | C | 0 . . . 1 | If the NF needs to be discoverable by other NFs in a different PLMN, then an FQDN that is used for inter-PLMN routing as specified in 3GPP 23.003 [12] shall be registered with the NRF (NOTE 8).<br>A change of this attribute shall result in triggering a "NF_PROFILE_CHANGED" notification from NRF towards subscribing NFs located in a different PLMN, but the new value shall be notified as a change of the "fqdn" attribute. |
| Ipv4Addresses | array(Ipv4Addr) | C | 1 . . . N | Ipv4 address(es) of the Network Function (NOTE 1) (NOTE 2) |
| ipv6Addresses | array(Ipv6Addr) | C | 1 . . . N | Ipv6 address(es) of the Network Function (NOTE 1) (NOTE 2) |

-continued

| Attribute name | Data type | P | Cardinality | Description |
|---|---|---|---|---|
| allowedPlmns | array(PlmnId) | O | 1 . . . N | PLMNs allowed to access the NF instance.<br>If not provided, any PLMN is allowed to access the NF.<br>A change of this attribute shall not trigger a "NF_PROFILE_CHANGED" notification from NRF, and this attribute shall not be included in profile change notifications to subscribed NFs. |
| allowedSnpns | array(PlmnIdNid) | O | 1 . . . N | SNPNs allowed to access the NF instance.<br>If this attribute is present in the NFService and in the NF profile, the attribute from the NFService shall prevail.<br>The absence of this attribute in both the NFService and in the NF profile indicates that no SNPN, other than the SNPN(s) registered in the snpnList attribute of the NF Profile, is allowed to access the service instance.<br>A change of this attribute shall not trigger a "NF_PROFILE_CHANGED" notification from NRF, and this attribute shall not be included in profile change notifications to subscribed NFs. |
| allowedNfTypes | array(NFType) | O | 1 . . . N | Type of the NFs allowed to access the NF instance.<br>If not provided, any NF type is allowed to access the NF.<br>A change of this attribute shall not trigger a "NF_PROFILE_CHANGED" notification from NRF, and this attribute shall not be included in profile change notifications to subscribed NFs. |
| allowedNfDomains | array(string) | O | 1 . . . N | Pattern (regular expression according to the ECMA-262 dialect [8]) representing the NF domain names within the PLMN of the NRF allowed to access the NF instance.<br>If not provided, any NF domain is allowed to access the NF.<br>A change of this attribute shall not trigger a "NF_PROFILE_CHANGED" notification from NRF, and this attribute shall not be included in profile change notifications to subscribed NFs. |
| allowedNssais | array(ExtSnssai) | O | 1 . . . N | S-NSSAI of the allowed slices to access the NF instance.<br>If not provided, any slice is allowed to access the NF.<br>A change of this attribute shall not trigger a "NF_PROFILE_CHANGED" notification from NRF, and this attribute shall not be included in profile change notifications to subscribed NFs. |
| Priority | integer | O | 0 . . . 1 | Priority (relative to other NFs of the same type) within the range 0 to 65535, to be used for NF selection; lower values indicate a higher priority. Priority may or may not be present in the nfServiceList parameters, xxxInfo parameters and in this attribute. Priority in the nfServiceList has precedence over the priority in this attribute, which has precedence over the priority in xxxInfo parameter. (NOTE 4).<br>The NRF may overwrite the received priority value when exposing an NFProfile with the Nnrf_NFDiscovery service. |
| Capacity | integer | O | 0 . . . 1 | Static capacity information within the range 0 to 65535, expressed as a weight relative to other NF instances of the same type; if capacity is also present in the nfServiceList parameters, those will have precedence over this value. (NOTE 4). |
| Load | integer | O | 0 . . . 1 | Dynamic load information, within the range 0 to 100, indicates the current load percentage of the NF. |
| loadTimeStamp | Date Time | O | 0 . . . 1 | It indicates the point in time in which the latest load information (sent by the NF in the "load" attribute of the NF Profile) was generated at the NF Instance.<br>If the NF did not provide a timestamp, the NRF should set it to the instant when the NRF received the message where the NF provided the latest load information. |
| Locality | string | O | 0 . . . 1 | Operator defined information about the location of the NF instance (e.g. geographic location, data center) (NOTE 3) |

-continued

| Attribute name | Data type | P | Cardinality | Description |
| --- | --- | --- | --- | --- |
| udrInfo | UdrInfo | O | 0 ... 1 | Specific data for the UDR (ranges of SUPI, group ID . . .) |
| udrInfoList | map(UdrInfo) | O | 1 ... N | Multiple entries of UdrInfo. This attribute provides additional information to the udrInfo. udrInfoList may be present even if the udrInfo is absent. The key of the map shall be a (unique) valid JSON string per clause 7 of IETF RFC 8259 [22], with a maximum of 32 characters. |
| udmInfo | UdmInfo | O | 0 ... 1 | Specific data for the UDM (ranges of SUPI, group ID . . .) |
| udmInfoList | map(UdmInfo) | O | 1 ... N | Multiple entries of UdmInfo. This attribute provides additional information to the udmInfo. udmInfoList may be present even if the udmInfo is absent. The key of the map shall be a (unique) valid JSON string per clause 7 of IETF RFC 8259 [22], with a maximum of 32 characters. |
| ausfInfo | AusfInfo | O | 0 ... 1 | Specific data for the AUSF (ranges of SUPI, group ID . . .) |
| ausfInfoList | map(AusfInfo) | O | 1 ... N | Multiple entries of AusfInfo. This attribute provides additional information to the ausfInfo. ausfInfoList may be present even if the ausfInfo is absent. The key of the map shall be a (unique) valid JSON string per clause 7 of IETF RFC 8259 [22], with a maximum of 32 characters. |
| amfInfo | AmfInfo | O | 0 ... 1 | Specific data for the AMF (AMF Set ID, . . .) |
| amfInfoList | map(AmfInfo) | O | 1 ... N | Multiple entries of AmfInfo. This attribute provides additional information to the amfInfo. amfInfoList may be present even if the amfInfo is absent. The key of the map shall be a (unique) valid JSON string per clause 7 of IETF RFC 8259 [22], with a maximum of 32 characters. |
| smfInfo | SmfInfo | O | 0 ... 1 | Specific data for the SMF (DNN's, . . .). (NOTE 12) |
| smfInfoList | map(SmfInfo) | O | 1 ... N | Multiple entries of SmfInfo. This attribute provides additional information to the smfInfo. smfInfoList may be present even if the smfInfo is absent. The key of the map shall be a (unique) valid JSON string per clause 7 of IETF RFC 8259 [22], with a maximum of 32 characters. (NOTE 12) |
| upfInfo | UpfInfo | O | 0 ... 1 | Specific data for the UPF (S-NSSAI, DNN, SMF serving area, interface . . .) |
| upfInfoList | map(UpfInfo) | O | 1 ... N | Multiple entries of UpfInfo. This attribute provides additional information to the upfInfo. upfInfoList may be present even if the upfInfo is absent. The key of the map shall be a (unique) valid JSON string per clause 7 of IETF RFC 8259 [22], with a maximum of 32 characters. |
| pcfInfo | PcfInfo | O | 0 ... 1 | Specific data for the PCF |
| pcfInfoList | map(PcfInfo) | O | 1 ... N | Multiple entries of PcfInfo. This attribute provides additional information to the pcfInfo. pcfInfoList may be present even if the pcfInfo is absent. The key of the map shall be a (unique) valid JSON string per clause 7 of IETF RFC 8259 [22], with a maximum of 32 characters. |
| bsfInfo | BsfInfo | O | 0 ... 1 | Specific data for the BSF |
| bsfInfoList | map(BsfInfo) | O | 1 ... N | Multiple entries of BsfInfo. This attribute provides additional information to the bsfInfo. bsfInfoList may be present even if the bsfInfo is absent. The key of the map shall be a (unique) valid JSON string per clause 7 of IETF RFC 8259 [22], with a maximum of 32 characters. |
| chfInfo | ChfInfo | O | 0 ... 1 | Specific data for the CHF |
| chfInfoList | map(ChfInfo) | O | 1 ... N | Multiple entries of ChfInfo. This attribute provides additional information to the chfInfo. chfInfoList may be present even if the chfInfo is absent. The key of the map shall be a (unique) valid JSON string per clause 7 of IETF RFC 8259 [22], with a maximum of 32 characters. |
| nefInfo | NefInfo | O | 0 ... 1 | Specific data for the NEF |
| nrfInfo | NrfInfo | O | 0 ... 1 | Specific data for the NRF |
| udsfInfo | UdsfInfo | O | 0 ... 1 | Specific data for the UDSF |
| udsfInfoList | map(UdsfInfo) | O | 1 ... N | Multiple entries of udsfInfo. This attribute provides additional information to the udsfInfo. udsfInfoExt may be present even if the udsfInfo is absent. |

-continued

| Attribute name | Data type | P | Cardinality | Description |
|---|---|---|---|---|
| nwdafInfo | NwdafInfo | O | 0 ... 1 | Specific data for the NWDAF. |
| pcscfInfoList | map(PcscfInfo) | O | 1 ... N | Specific data for the P-CSCF.<br>The key of the map shall be a (unique) valid JSON string per clause 7 of IETF RFC 8259 [22], with a maximum of 32 characters.<br>(NOTE 11) |
| hssInfoList | map(HssInfo) | O | 1 ... N | Specific data for the HSS.<br>The key of the map shall be a (unique) valid JSON string per clause 7 of IETF RFC 8259 [22], with a maximum of 32 characters. |
| customInfo | object | O | 0 ... 1 | Specific data for custom Network Functions |
| recoveryTime | DateTime | O | 0 ... 1 | Timestamp when the NF was (re)started (NOTE 5) (NOTE 6) |
| nfServicePersistence | boolean | O | 0 ... 1 | true: If present, and set to true, it indicates that the different service instances of a same NF Service in this NF instance, supporting a same API version, are capable to persist their resource state in shared storage and therefore these resources are available after a new NF service instance supporting the same API version is selected by a NF Service Consumer (see 3GPP 23.527 [27]).<br>false (default): Otherwise, it indicates that the NF Service Instances of a same NF Service are not capable to share resource state inside the NF Instance. |
| nfServices | array(NFService) | O | 1 ... N | List of NF Service Instances. It shall include the services produced by the NF that can be discovered by other NFs, if any. (NOTE 15)<br>This attribute is deprecated; the attribute "nfServiceList" should be used instead. |
| nfServiceList | map(NFService) | O | 1 ... N | Map of NF Service Instances, where the "serviceInstanceId" attribute of the NFService object shall be used as the key of the map. (NOTE 15)<br>It shall include the services produced by the NF that can be discovered by other NFs, if any. |
| nfProfileChangesSupportInd | boolean | O | 0 ... 1 | NF Profile Changes Support Indicator.<br>See Annex B.<br>This IE may be present in the NFRegister or NFUpdate (NF Profile Complete Replacement) request and shall be absent in the response.<br>True: the NF Service Consumer supports receiving NF Profile Changes in the response.<br>False (default): the NF Service Consumer does not support receiving NF Profile Changes in the response.<br>Write-Only: true |
| nfProfileChangesInd | boolean | O | 0 ... 1 | NF Profile Changes Indicator.<br>See Annex B.<br>This IE shall be absent in the request to the NRF and may be included by the NRF in NFRegister or NFUpdate (NF Profile Complete Replacement) response.<br>True: the NF Profile contains NF Profile changes.<br>False (default): complete NF Profile.<br>Read-Only: true |
| defaultNotificationSubscriptions | array(DefaultNotificationSubscription) | O | 1 ... N | Notification endpoints for different notification types. (NOTE 10) |
| lmfInfo | LmfInfo | O | 0 ... 1 | Specific data for the LMF |
| gmlcInfo | GmlcInfo | O | 0 ... 1 | Specific data for the GMLC |
| nfSetIdList | array(NfSetId) | C | 1 ... N | NF Set ID defined in clause 28.12 of 3GPP TS 23.003 [12]<br>At most one NF Set ID shall be indicated per PLMN of the NF.<br>This information shall be present if available. |
| servingScope | array(string) | O | 1 ... N | The served area(s) of the NF instance.<br>The absence of this attribute does not imply that the NF instance can serve every area in the PLMN.<br>(NOTE 13) |
| lcHSupportInd | boolean | O | 0 ... 1 | This IE indicates whether the NF supports Load Control based on LCI Header (see clause 6.3 of 3GPP TS 29.500 [4]).<br>true: the NF supports the feature.<br>false (default): the NF does not support the feature. |

| Attribute name | Data type | P | Cardinality | Description |
| --- | --- | --- | --- | --- |
| olcHSupportInd | boolean | O | 0 . . . 1 | This IE indicates whether the NF supports Overload Control based on OCI Header (see clause 6.4 of 3GPP TS 29.500 [4]).<br>true: the NF supports the feature.<br>false (default): the NF does not support the feature. |
| nfSetRecoveryTimeList | map(DateTime) | O | 1 . . . N | Map of recovery time, where the key of the map is the NfSetId of NF Set(s) that the NF instance belongs to.<br>When present, the value of each entry of the map shall be the recovery time of the NF Set indicated by the key. |
| serviceSetRecoveryTimeList | map(DateTime) | O | 1 . . . N | Map of recovery time, where the key of the map is the NfServiceSetId of the NF Service Set(s) configured in the NF instance.<br>When present, the value of each entry of the map shall be the recovery time of the NF Service Set indicated by the key. |
| scpDomains | array(string) | O | 1 . . . N | When present, this IE shall carry the list of SCP domains the SCP belongs to, or the SCP domain the NF (other than SCP) belongs to. (NOTE 14) |
| scpInfo | ScpInfo | O | 0 . . . 1 | Specific data for the SCP |
| Storage | Storage Info | O | 0 . . . 1 | Specific info relative to storage |
| Network | Network Info | O | 0 . . . 1 | Specific info relative to network |

(NOTE 1):
At least one of the addressing parameters (fqdn, ipv4address or ipv6adress) shall be included in the NF Profile. If the NF supports the NF services with "https" URI scheme (i.e use of TLS is mandatory), then the FQDN shall be provided in the NF Profile or the NF Service profile (see clause 6.1.6.2.3). See (NOTE 1) of Table 6.1.6.2.3-1 for the use of these parameters. If multiple ipv4 addresses and/or ipv6 addresses are included in the NF Profile, the NF Service Consumer of the discovery service shall select one of these addresses randomly, unless operator defined local policy of IP address selection, in order to avoid overload for a specific ipv4 address and/or ipv6 address.
(NOTE 2):
If the type of Network Function is UPF, the addressing information is for the UPF N4 interface.
(NOTE 3):
A requester NF may use this information to select a NF instance (e.g. a NF instance preferably located in the same data center).
(NOTE 4):
The capacity and priority parameters, if present, are used for NF selection and load balancing. The priority and capacity attributes shall be used for NF selection in the same way that priority and weight are used for server selection as defined in IETF RFC 2782 [23].
(NOTE 5):
The NRF shall notify NFs subscribed to receiving notifications of changes of the NF profile, if the NF recoveryTime or the nfStatus is changed. See clause 6.2 of 3GPP 23.527 [27].
(NOTE 6):
A requester NF may consider that all the resources created in the NF before the NF recovery time have been lost. This may be used to detect a restart of a NF and to trigger appropriate actions, e.g. release local resources. See clause 6.2 of 3GPP 23.527 [27].
(NOTE 7):
A NF may register multiple PLMN IDs in its profile within a PLMN comprising multiple PLMN IDs. If so, all the attributes of the NF Profile shall apply to each PLMN ID registered in the plmnList. As an exception, attributes including a PLMN ID, e.g. IMSI-based SUPI ranges, TAIs and GUAMIs, are specific to one PLMN ID and the NF may register in its profile multiple occurrences of such attributes for different PLMN IDs (e.g. the UDM may register in its profile SUPI ranges for different PLMN IDs).
(NOTE 8):
Other NFs are in a different PLMN if they belong to none of the PLMN ID(s) configured for the PLMN of the NRF.
(NOTE 9):
This is for the use case where an NF (e.g. AMF) supports multiple PLMNs and the slices supported in each PLMN are different. See clause 9.2.6.2 of 3GPP TS 38.413 [29].
(NOTE 10):
If notification endpoints are present both in the profile of the NF instance (NFProfile) and in some of its NF Services (NFService) for a same notification type, the notification endpoint(s) of the NF Services shall be used for this notification type.
(NOTE 11):
The absence of the pcscfInfoList attribute in a P-CSCF profile indicates that the P-CSCF can be selected for any DNN and Access Type.
(NOTE 12):
The absence of both the smfInfo and smfInfoList attributes in an SMF profile indicates that the SMF can be selected for any S-NSSAI, DNN, TAI and access type.
(NOTE 13):
The servingScope attribute may indicate geographical areas, It may be used e.g. to discover and select NFs in centralized Data Centers that are expected to serve users located in specific region(s) or province(s). It may also be used to reduce the large configuration of TAIs in the NF instances.
(NOTE 14):
An NF (other than a SCP) can register at most one SCP domain in NF profile, i.e. the NF can belong to only one SCP domain. If an NF (other than a SCP) includes this information in its profile, this indicates that the services produced by this NF should be accessed preferably via an SCP from the SCP domain the NF belongs to.
(NOTE 15):
If the NF Service Consumer that issues an NF profile retrieval request indicates support for the "Service-Map" feature, the NRF shall return in the NF profile retrieval response the list of NF Service Instances in the "nfServiceList" map attribute. Otherwise, the NRF shall return the list of NF Service Instances in the "nfServices" array attribute.

Hence, the NF profile may be registered in the NRF using the Nnrf_NFManagement Service API so as for the NF to register its profile with one or more new parameters relating to storage and/or network, as outlined above.

In step S304 (which may correspond to steps S706 and S804 of the FIGS. 7 and 8, respectively), the NRF 120 acknowledges this information by sending an Nnrf_NFMgmt NFRegister {200 OK} to the NF 306.

Figure 4:
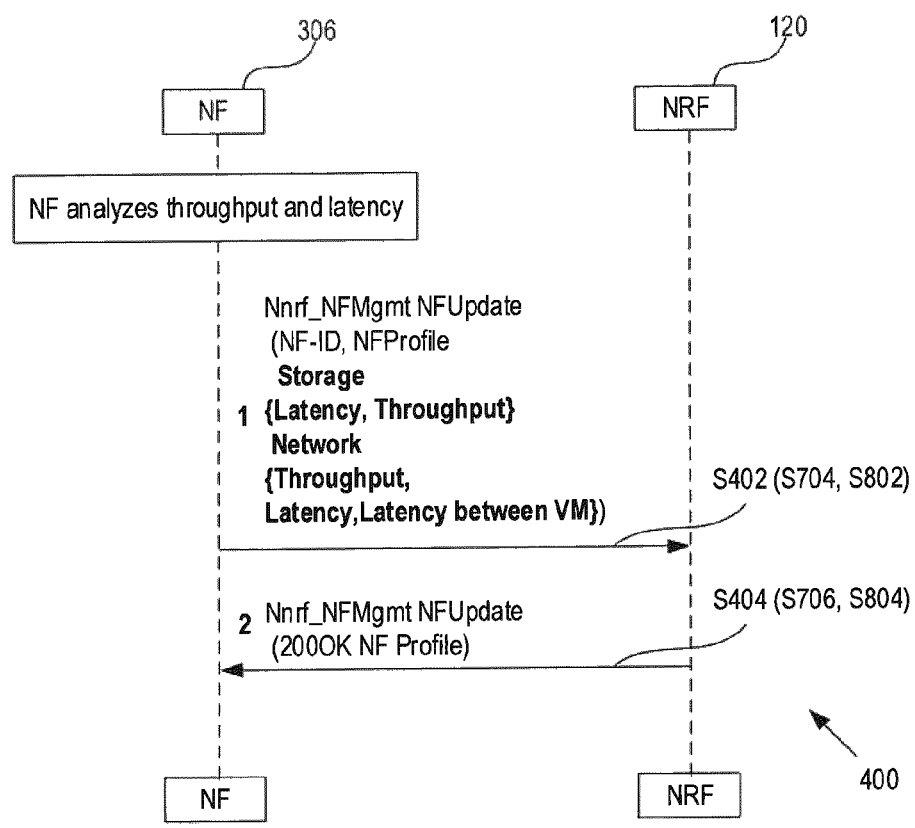
FIG. 4 is a sequence diagram of an NF update method according to examples of the present disclosure.

FIG. 4 shows a sequence diagram of a method 400 for updating an NF profile of an NF 306 in the NRF 120.

In this example, after the NF 306 has analyzed the throughput and latency characteristic in the wireless communication network, the NF 306 sends, in step S402 (which may, as outlined further below, correspond to steps S704 and S802 of the FIGS. 7 and 8, respectively), an Nnrf_NFMgmt NFUpdate request to the NRF 120. The request comprises information relating to the NF-ID and the NF profile.

The NF profile comprises, in this example, information relating to storage and network characteristics. Generally, these storage and network characteristics relate to those outlined above in relation to the corresponding information provided to the NRF according to the example shown in FIG. 3. While hardware (for example in relation to a hardware accelerator) characteristics could be included in the update request, only throughput and latency information is provided to the NRF 120 in this example. This is because it may, in some examples, be assumed that those parameters can be updated more frequently than the hardware (accelerator). It may, in some examples, be expected that once an NF is installed which uses a hardware accelerator, the NF uses the hardware accelerator during the whole lifetime usage of the NF.

In step S404 (which may correspond to steps S706 and S804 of the FIGS. 7 and 8, respectively), the NRF 120 acknowledges this information by sending an Nnrf_NFMgmt NFUpdate {200 OK NF Profile} to the NF 306.

Figure 5A:
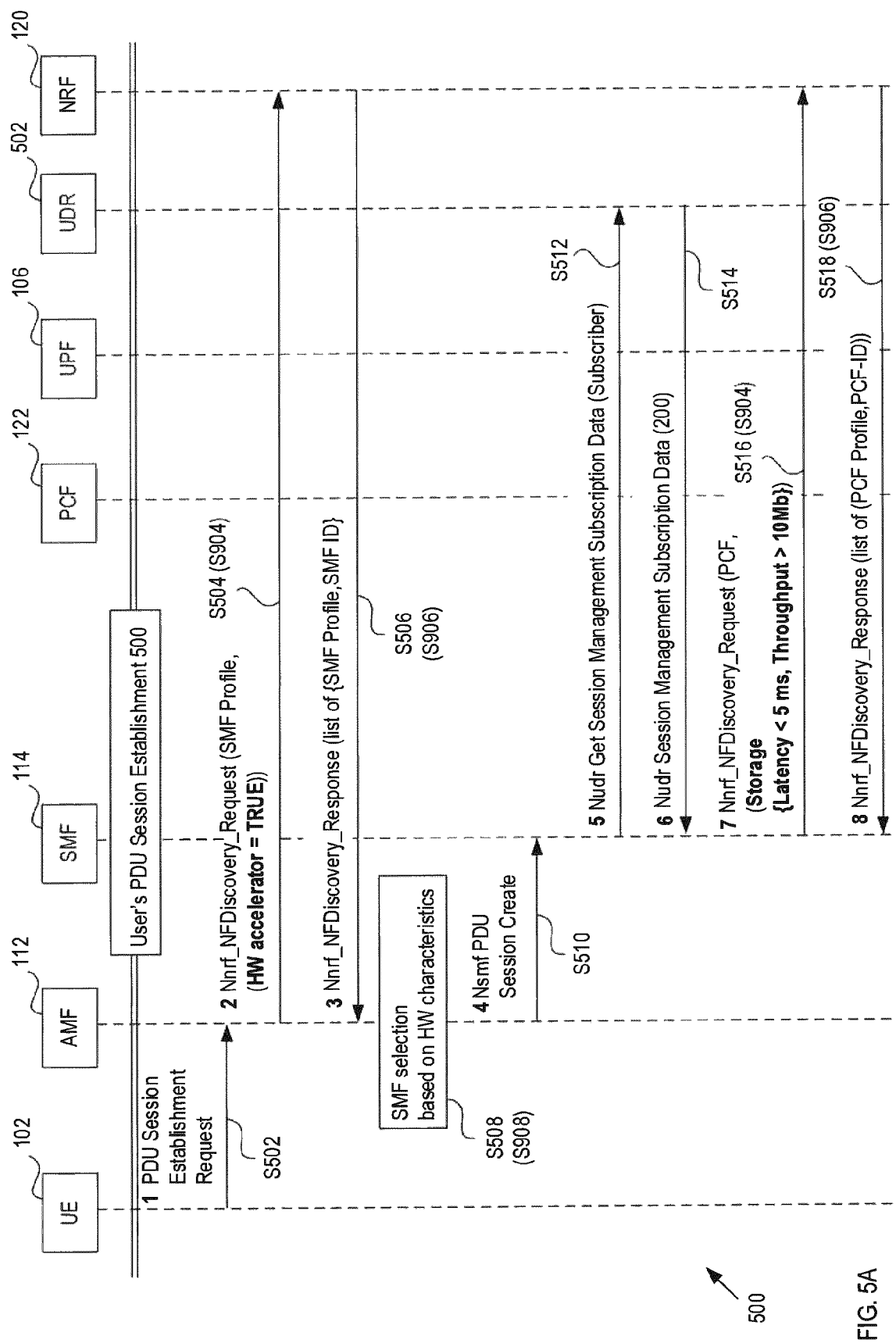
FIGS. 5A and B depict a sequence diagram for a PDU session establishment according to examples of the present disclosure.
Figure 5B:
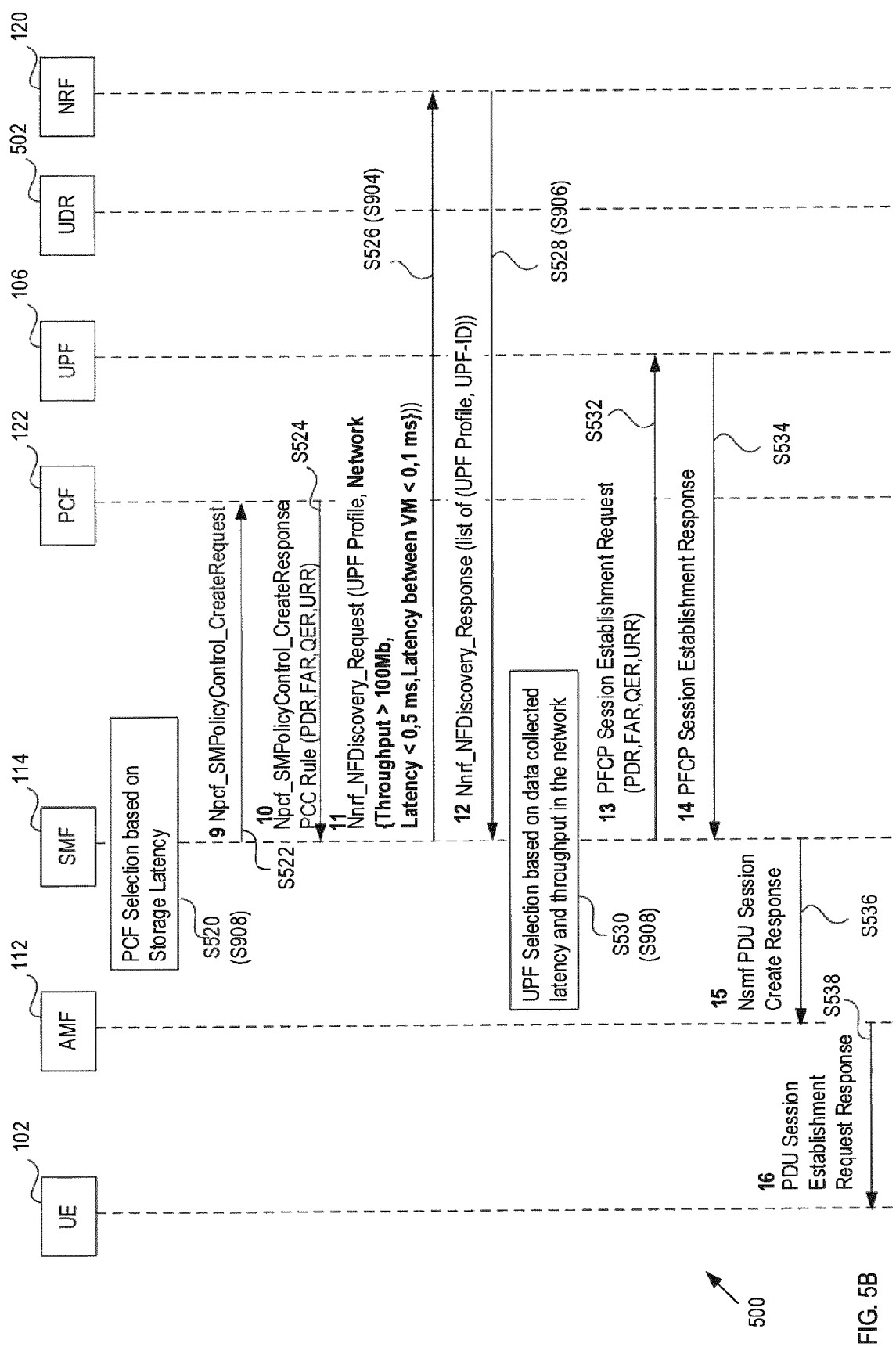

FIGS. 5A and B depict a sequence diagram of a method 500 of a user PDU session establishment according to examples outlined throughout the present disclosure. In this example, the SMF 114, PCF 122 and UPF 106 are registered and discovered based on the new parameters, but the present disclosure does not restrict to registration and discovery of SMF 114, PCF 122 and UPF 106, but instead applies to registration and discovery of any type of NF.

In this example, at step S502, the UE 102 sends a PDU session establishment request to the AMF 112.

The AMF 112 then asks, in step S504 (which may correspond to step S904 in FIG. 9), for an SMF 114 using an NF discovery process towards the NRF 120, based on an Nnrf_NFDiscover_Request. The request relates to information regarding an SMF 114 having a specific SMF profile. In this example, the specific SMF profile relates to an SMF profile which indicates that the SMF has a hardware accelerator ("HW accelerator=TRUE"). This information may have been provided by one or more SMFs to the NRF 120 in a previous NF register or update request, in line with the procedures outlined in relation to FIGS. 3, 4, 7, 8 and 9, respectively.

At step S506 (which may correspond to step S906 in FIG. 9), the NRF 120 answers with an Nnrf_NFDiscovery_response, with which it provides to the AMF 112 a list of SMF instances matching the requested NF (SMF) profile with the new parameter regarding the hardware accelerator as outlined above and as defined based on the procedure depicted in FIG. 3 (or FIG. 4, 7, 8, or 9).

At step S508 (which may correspond to step S908 in FIG. 9), the AMF 114 selects an SMF 114 based on hardware characteristics of the SMF 114.

The AMF 112 then sends, in step S510, an Nsmf PDU session create to the SMF instance that has been selected based on the hardware characteristics.

The SMF 114 then sends a message to the UDR 502 to ask the UDR 502 to retrieve subscription information relating to the subscriber.

The UDR 502 answers to the SMF 114 with the requested subscription information in step S514.

In step S516 (which may correspond to step S904 in FIG. 9), the SMF 114 sends an Nnrf_NFDiscovery request to the NRF 120 in order to ask for a PCF 122 having certain characteristics. In this example, the SMF 114 asks for a PCF whose main characteristics are a latency in storage of less than 5 ms and a throughput in storage of more than 10 Mb. As will be appreciated, other latency and/or throughput characteristics may be requested. This information may have been provided by one or more PCFs to the NRF 120 in a previous NF register or update request, in line with the procedures outlined in relation to FIGS. 3, 4, 7, 8 and 9, respectively.

At step S518 (which may correspond to step S906 in FIG. 9), the NRF 120 answers with a list of PCF instances matching the requested NF (PCF) profile.

At step S520 (which may correspond to step S908 in FIG. 9), the SMF 114 selects the PCF instance based, in this example, both on the data provided by the UDR 502 in step S514 and the PCF instance retrieved from the NRF 120 in step S520. The SMF 114 creates the corresponding session towards the selected PCF 122 at step S522, and the PCF 122 acknowledges the previous request in step S524.

In the step S526 (which may correspond to step S904 in FIG. 9), the SMF 114 asks for a UPF 106 using an NF discovery process towards the NRF 120. In this example, the SMF 114, knowing that the end user needs a low latency (from UDR subscription data) asks for a UPF 106 with the following characteristics: a latency in the network being less than 0.5 ms, a latency between virtual machines being 0.1 ms, and a throughput in the network being more than 100 Mb. As will be appreciated, any other thresholds may be required. This information may have been provided by one or more UPFs to the NRF 120 in a previous NF register or update request, in line with the procedures outlined in relation to FIGS. 3, 4, 7, 8 and 9, respectively.

In step S528 (which may correspond to step S906 in FIG. 9), the NRF 120 answers to the SMF 114 with a list of UPF instances matching the requested NF (UPF) profile.

The SMF 114 then selects, at step S530 (which may correspond to step S908 in FIG. 9), the UPF instance based both on the data provided by UDR 502 in step S514 and the UPF instances retrieved from the NRF 120 in step S528. In this example, if the UPF 106 is for a subscriber that belongs to a URLLC slice, it selects the UPF 106 with a lowest latency. The SMF 114 establishes, at step S532, a session with the selected UPF instance. The UPF 106 than answers to the SMF 114 at step S534 with a PFCP session establishment response.

The SMF 114 then sends, at step S536, an NsmF PDU session create response to the AMF 112.

Finally, at step S538, the AMF 112 sends a PDU session establishment request response to the UE 102.

Figure 6:
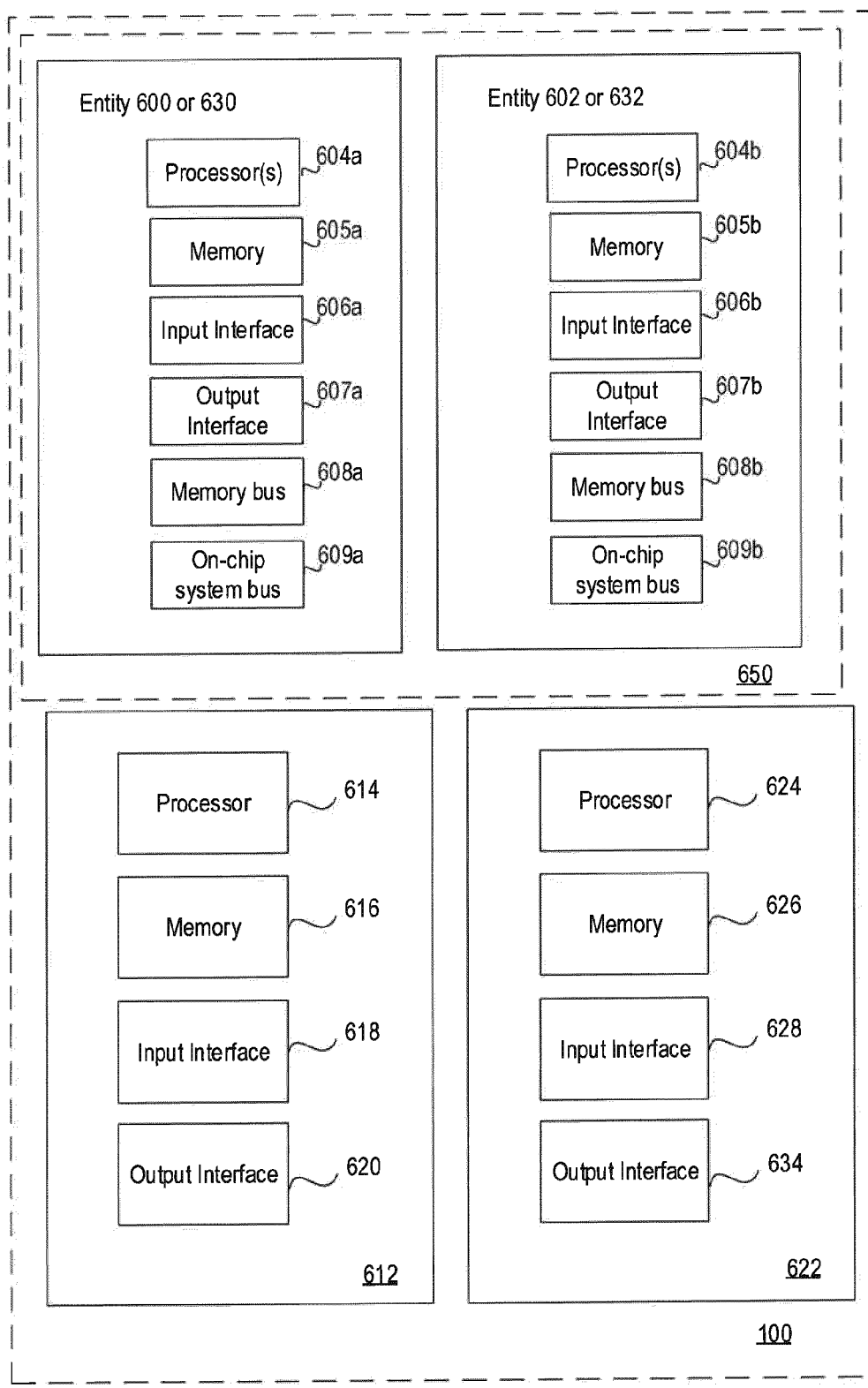
FIG. 6 is a block diagram of entities comprised in the wireless communication network according to examples of the present disclosure.

FIG. 6 shows a schematic block diagram of entities comprised in the wireless communication network 100.

In this example, the top left entity and the top right entity may each respectively refer to hardware 600 and 602 which may be comprised in the wireless communication network 100. The hardware characteristic relating to the one or parameters comprised in the NF profile register or update request according to examples outlined throughout the present disclosure may relate to operations involving or performed by respective one or more processors 604a or one or more processors 604b, memory 605a and/or memory 605b, respectively. The entities 600 and 602 may each comprise an input interface 606a and 606b, respectively, and an output interface 607a and 607b, respectively. These interfaces may be taken into account when determining, for example, a throughput of a communication in the respective entity.

Each of entities 600 and 602 further comprises a memory bus 608a and 608b, respectively, and an on-chip system bus 609a and 609b, respectively, which may form the basis of hardware accelerator information comprised in the NF profile updated or registered in the NRF according to example implementations as described herein.

The top left entity may also relate to an apparatus 630 adapted to operate in the wireless communication network 100, wherein the apparatus is configured to: send, to a Network Repository Function, NRF, 120, a request to register or update an NF profile of a Network Function, NF, 306, in the NRF 120. The NF profile signaled via the request comprises one or more parameters relating to one or more of: a hardware characteristic of hardware (e.g. hardware 600 or 602) comprised in the wireless communication network, a latency characteristic of the wireless communication network, and a throughput characteristic of the wireless communication network. The apparatus is further adapted to receive, from the NRF, an acknowledgement of the request.

Similarly, the top right entity may also relate to an apparatus 632 adapted to operate in a wireless communication network 100, wherein the apparatus is configured to: receive, from a first Network Function, NF, 306, a request to register or update an NF profile of the first NF 306 in a Network Repository Function, NRF, 120. The NF profile signaled via the request comprises one or more parameters relating to one or more of: a hardware characteristic of hardware (e.g. hardware 600, 602) comprised in the wireless communication network 100, a latency characteristic of the wireless communication network, and a throughput characteristic of the wireless communication network. The apparatus 632 is further adapted to send, to the first NF 306, an acknowledgement of the request.

The apparatus 630 and the apparatus 632 are, in this example, comprised in, or constitute a system 650.

Furthermore, in this example, virtual machines 612 and 622 are comprised in the wireless communication network 100. Each of the virtual machines comprises a processor 614 and 624, respectively, a memory 616 and 626, respectively, an input interface 618 and 628, respectively, and an output interface 620 and 634, respectively. The latency between the virtual machines may be comprised in the NF profile to be registered or updated in the NRF according to example implementations as described herein.

Figure 7:
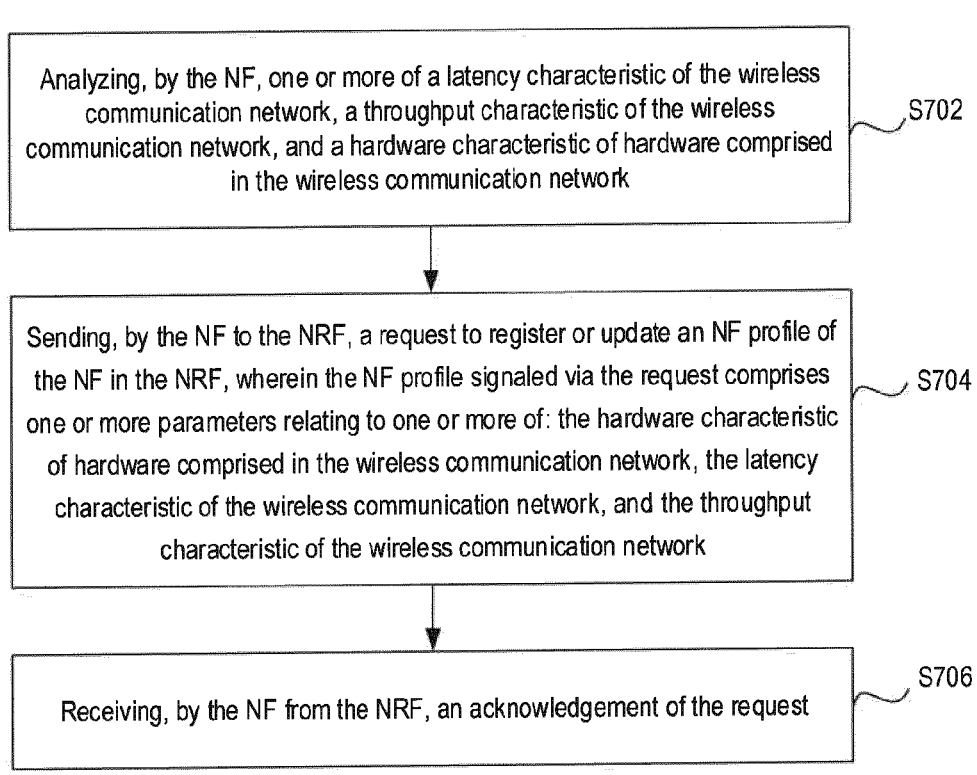
FIGS. 7 to 9 illustrate flow diagrams of methods according to examples of the present disclosure.

FIG. 7 shows a flow diagram of a method 700 according to example implementations as described herein.

At step S702, the method 700 comprises analyzing, by the NF, one or more of a latency characteristic of the wireless communication network, a throughput characteristic of the wireless communication network, and a hardware characteristic of hardware comprised in the wireless communication network. Based on the analysis, the NF may then send, at step S704, to the NRF, a request to register or update an NF profile of the NF in the NRF. The NF profile signaled via the request comprises one or more parameters relating to one or more of the hardware characteristic of hardware comprised in the wireless communication network, the latency characteristic of the wireless communication network, and the throughput characteristic of the wireless communication network. In response to the request, the NF may then, at step S706, receive from the NRF an acknowledgement of the request.

Figure 8:
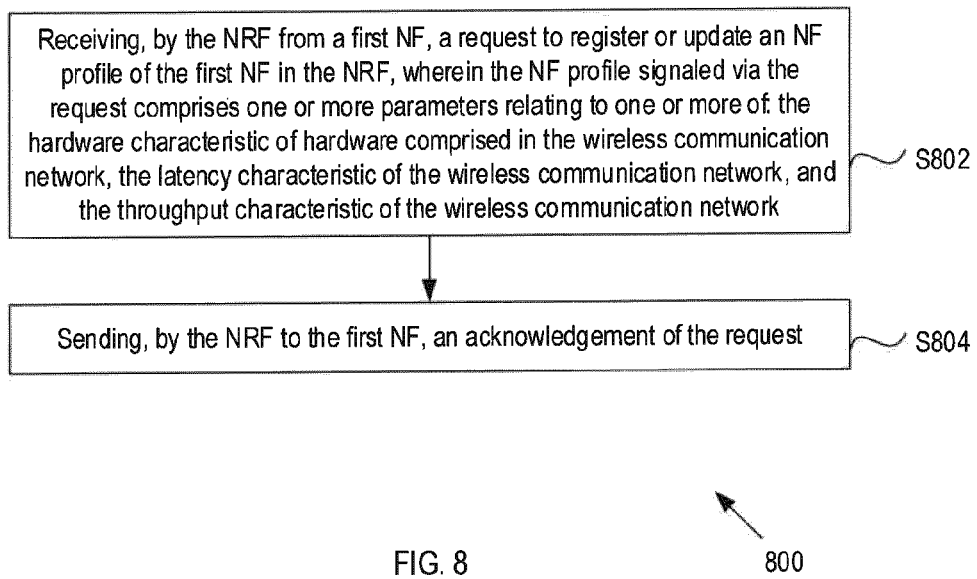

FIG. 8 shows a flow diagram of a method 800 according to example implementations as described herein.

At step 802, the method 800 comprises receiving, by the NRF from a first NF, a request to register or update an NF profile of the first NF in the NRF. The NF profile signaled via the request comprises one or more parameters relating to one or more of the hardware characteristic of hardware comprised in the wireless communication network, the latency characteristic of the wireless communication network, and the throughput characteristic of the wireless communication network. At step S804, the NRF sends to the first NF an acknowledgement of the request.

Figure 9:
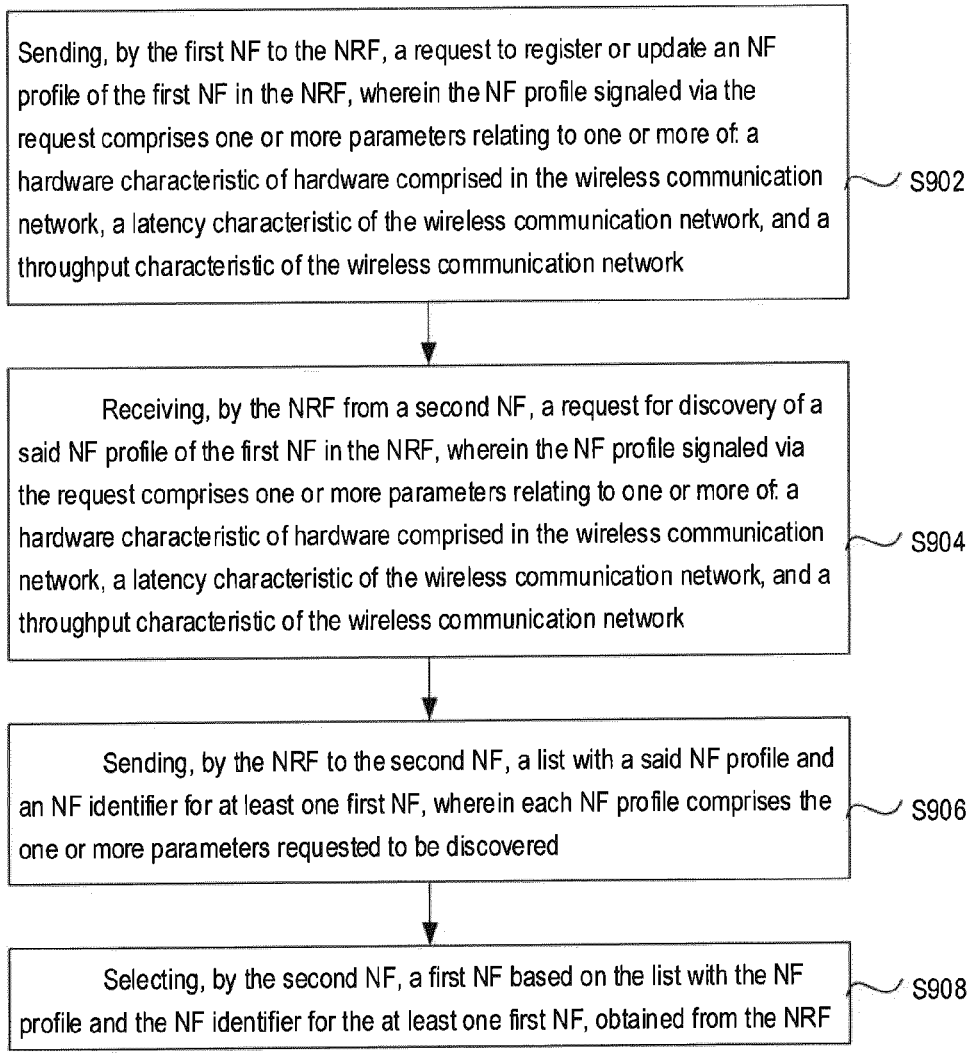

FIG. 9 shows a flow diagram of a method 900 according to example implementations as described herein.

At step S902, the first NF sends to the NRF a request to register or update an NF profile of the first NF in the NRF. The NF profile signaled via the request comprises one or more parameters relating to one or more of: a hardware characteristic of hardware comprised in the wireless communication network, a latency characteristic of the wireless communication network, and a throughput characteristic of the wireless communication network.

The NRF then receives at step S904 from a second NF a request for discovery of a said NF profile of the first NF in the NRF. The NF profile signaled via the request comprises one or more parameters relating to one or more of: a hardware characteristic of hardware comprised in the wireless communication network, a latency characteristic of the wireless communication network, and a throughput characteristic of the wireless communication network. One or more of the hardware characteristic of hardware comprised in the wireless communication network, a latency characteristic of the wireless communication network, and a throughput characteristic of the wireless communication network signaled via the request at step S902 may be identical to one or more of, correspondingly, the hardware characteristic of hardware comprised in the wireless communication network, a latency characteristic of the wireless communication network, and a throughput characteristic of the wireless communication network comprised in the discovery request.

At step S906, the NRF then sends to the second NF a list with a said NF profile and an NF identifier for at least one first NF. Each NF profile comprises the one or more parameters requested to be discovered. Based thereon, the second NF then selects, in step S908, a first NF based on the list with the NF profile and the NF identifier for the at least one first NF, obtained from the NRF.

The examples outlined herein are based on extending the NF registration/update and discovery procedures to allow NF selection based on hardware characteristics and throughput and latency parameters. As will be appreciated, example implementations outlined throughout the present disclosure may allow for a new procedure for selecting or re-selecting an NF based on one or more of hardware characteristics, one or more throughput parameters and one or more latency parameters. Since software that uses hardware accelerator may provide for a better QoS, the infrastructure/NF with specific characteristics might be selected in particular for improved performance. Similar, performance improvements can be achieved using an NF based on specific throughput and/or latency characteristics of the wireless communication network. Energy improvements may be achieved at the node equipment or at the network level. Furthermore, more accurate dimensioning of subscribers according to the corresponding service level agreement for each subscriber may be provided.

It will be appreciated that the present disclosure has been described with reference to exemplary embodiments that may be varied in many aspects. As such, the present invention is only limited by the claims that follow.

The invention claimed is:

1. A method performed by a Network Function, NF, in a wireless communication network, wherein the method comprises:

sending, by the NF to a Network Repository Function, NRF, a request to register or update an NF profile of the NF in the NRF, wherein the request comprises a hardware acceleration characteristic, wherein the hardware acceleration characteristic indicates specialized hardware associated with the NF for performing the at least one function, wherein the at least one function comprises at least one of encryption, digital signal processing, packet header processing, packet buffering, packet scheduling, and compression of one or more data files by the NF;

and receiving, by the NF from the NRF, an acknowledgement of the request.

2. The method of claim 1, wherein the request comprises a latency characteristic, and wherein the latency characteristic comprises a latency for processing a data packet in the NF.

3. The method of claim 1, wherein the request comprises a latency characteristic, and wherein the latency characteristic comprises a latency between two or more virtual machines comprised in the wireless communication network.

4. The method of claim 1, wherein the request comprises a throughput characteristic, and wherein the throughput characteristic comprises a throughput of a communication in the NF.

5. The method of claim 1, wherein the request comprises a latency characteristic, and wherein the throughput characteristic comprises a latency for one or both of storing information in the NF and retrieving information from the NF.

6. The method of claim 5, wherein the latency for storing information in the NF relates to an amount of time for informing an application that a storage operation is completed.

7. The method of claim 1, wherein the request comprises a throughput characteristic, and wherein the throughput characteristic comprises a throughput for one or both of storing data in the NF and retrieving data from the NF.

8. The method of claim 7, further comprising, prior to sending, by the NF to the NRF, the request to update the NF profile of the NF in the NRF, analyzing, by the NF, the throughput characteristic of the wireless communication network.

9. The method of claim 1, further comprising, prior to sending, by the NF to the NRF, the request to up-date the NF profile of the NF in the NRF, analyzing, by the NF, the hardware characteristic.

10. A method performed by a Network Repository Function, NRF, in a wireless communication network, wherein the method comprises:

receiving, by the NRF from a first Network Function, NF, a request to register or update an NF profile of the first NF in the NRF, wherein the request comprises a hardware acceleration characteristic, wherein the hardware acceleration characteristic indicates specialized hardware associated with the NF for performing the at least one function, wherein the at least one function comprises at least one of encryption, digital signal processing, packet header processing, packet buffering, packet scheduling, and compression of one or more data files by the NF;

and sending, by the NRF to the first NF, an acknowledgement of the request.

11. The method of claim 10 wherein the request comprises a latency characteristic, and wherein the latency characteristic comprises a latency for processing a data packet in the first NF.

12. The method of claim 10, wherein the request comprises a latency characteristic, and wherein the latency characteristic comprises a latency between two or more virtual machines comprised in the wireless communication network.

13. The method of claim 10, wherein the request comprises a throughput characteristic, and wherein the throughput characteristic comprises a throughput of a communication in the first NF.

14. The method of claim 10, wherein the request comprises a latency characteristic, and wherein the latency characteristic comprises a latency for one or both of storing information in the first NF and retrieving information from the first NF.

15. The method of claim 14, wherein the latency for storing information in the first NF relates to an amount of time for informing an application that a storage operation is completed.

16. A method performed in a wireless communication network that comprises a first Network Function, NF, a Network Repository Function, NRF, and a second NF, wherein the method comprises:

sending, by the first NF to the NRF, a request to register or update an NF profile of the first NF in the NRF, wherein the request comprises a hardware acceleration characteristic, wherein the hardware acceleration characteristic indicates specialized hardware associated with the first NF for performing the at least one function, wherein the at least one function comprises at least one of encryption, digital signal processing, packet header processing, packet buffering, packet scheduling, and compression of one or more data files by the first NF;

receiving, by the NRF from a second NF, a request for discovery of the NF profile of the first NF in the NRF, wherein the request comprises the hardware acceleration characteristic;

determining, by the NRF, that the NF profile of the first NF includes the hardware acceleration characteristic indicating the specialized hardware associated with the first NF;

based on the NF profile of the first NF including the hardware acceleration characteristic indicating the specialized hardware associated with the first NF, sending, by the NRF to the second NF, a list with the NF profile and an NF identifier for at least the first NF; and selecting, by the second NF, the first NF based on the list with the NF profile and the NF identifier for the first NF obtained from the NRF.

\* \* \* \* \*